(12) United States Patent
Oser et al.

(10) Patent No.: US 11,268,836 B2
(45) Date of Patent: Mar. 8, 2022

(54) PROCESS MEASUREMENT TECHNOLOGY SENSOR

(71) Applicant: Endress+Hauser Conducta GmbH+Co. KG, Gerlingen (DE)

(72) Inventors: Julian Oser, Stuttgart (DE); Frank Weber, Stuttgart (DE)

(73) Assignee: ENDRESS+HAUSER CONDUCTA GMBH+CO. KG, Gerlingen (DE)

( * ) Notice: Subject to any disclaimer, the term of this patent is extended or adjusted under 35 U.S.C. 154(b) by 303 days.

(21) Appl. No.: 16/700,070

(22) Filed: Dec. 2, 2019

(65) Prior Publication Data
US 2020/0173820 A1 Jun. 4, 2020

(30) Foreign Application Priority Data

Dec. 3, 2018 (DE) .................. 10 2018 130 669.5

(51) Int. Cl.
*F16T 1/48* (2006.01)
*G01D 11/24* (2006.01)
*G02B 27/00* (2006.01)

(52) U.S. Cl.
CPC ........... *G01D 11/245* (2013.01); *F16T 1/48* (2013.01); *G02B 27/0006* (2013.01)

(58) Field of Classification Search
CPC ...... G01D 11/245; F16T 1/48; G02B 27/0006
See application file for complete search history.

(56) References Cited

U.S. PATENT DOCUMENTS 3,626,755 A * 12/1971 Rudolph .............. G01F 1/42
73/861.52
2017/0003251 A1 1/2017 Imai et al.

FOREIGN PATENT DOCUMENTS

| CN | 104089639 | A | 10/2014 |
| CN | 204389468 | U | 6/2015 |
| CN | 106404038 | A | 2/2017 |
| CN | 206573255 | U | 10/2017 |
| DE | 19717032 | A1 | 10/1998 |
| DE | 19956675 | A1 | 5/2001 |
| DE | 102004045395 | A1 | 3/2006 |
| EP | 2081073 | A1 | 7/2009 |
| KR | 20110053558 | A | 5/2011 |

OTHER PUBLICATIONS

Li, Xu-hai, Anti-condensation Technology on Vehicle Oxygen Sensor, China Academic Journal Electronic Publishing House, U463.6, A, 1003-8639 (2017) 08-0053-03, 3 pp.
Wang, Chao, Ding, Hongbing, Zhao, Yakun, Hu, Yonghui, Sensor system for unsteady flow characteristics in a sonic nozzle with vapor condensation, 2014 IEEE, 4 pp.

* cited by examiner

Primary Examiner — Jamel E Williams
(74) Attorney, Agent, or Firm — Mark A. Logan; Endress+Hauser (USA) Holding Inc.

(57) ABSTRACT

Process measurement technology sensor, comprising a sensor housing having a sensor head, wherein the sensor head has at least one sensor element for determining a measurand of a measured medium which is arranged inside the sensor housing, and wherein the sensor has electronic measuring equipment which is arranged inside the sensor housing, wherein the sensor housing has, at a distance from the electronic measuring equipment and from the sensor element, a condensation trap in the form of a local region of a wall of the sensor housing with reduced wall thickness.

11 Claims, 2 Drawing Sheets

PROCESS MEASUREMENT TECHNOLOGY SENSOR

CROSS-REFERENCE TO RELATED APPLICATION

The present application is related to and claims the priority benefit of German Patent Application No. 10 2018 130 669.5, filed on Dec. 3, 2018, the entire contents of which are incorporated herein by reference.

TECHNICAL FIELD

The present disclosure relates to a process measurement technology sensor.

BACKGROUND

Sensors in process measurement technology are often exposed to harsh conditions. In order for the sensors to withstand all environmental conditions, various measures must be taken. As a rule, the sensors are constructed in such a way that no external liquid or moisture can penetrate into the interior of the sensor. This may be realized via welding, sealing, encapsulation etc. Penetrating air may likewise transport moisture into the interior of the sensor and influence sensitive electronic measuring equipment there, or even lead to its failure.

Nevertheless, some components must be accessible and therefore cannot be welded or encapsulated. Dead spaces that are thereby produced in the sensor may still contain moisture in spite of precautions such as seals, desiccants etc.

Furthermore, a certain residual moisture remains in the sensor interior after assembly, and further moisture accumulates over time via diffusion effects. In the worst case, the moisture condenses in the enclosed air volume.

Seals may be used to reduce this risk. However, these are usually expensive and must be positioned in a complex manner in terms of design.

A further variant exists in the possibility of casting the sensor, which entails an increased expenditure of time and material and hinders the interchangeability of individual components of the sensor in the event of maintenance.

EP 2 081 073 A offers a corrugated surface along the inside of an electronics housing as a condensation trap, wherein the corrugation prevents the condensation water from draining off. The corrugated surface thereby ensures an increase in the wall thickness in the region of the condensation trap, so that a precipitation of condensed water along the corrugated surface when the housing is cooled is rather unlikely.

SUMMARY

Starting from the aforementioned problem, the present disclosure is based on the object of providing a process measurement technology sensor which at least reduces the problem of condensing liquids within a sensor.

A process measurement technology sensor according to the present disclosure comprises a sensor housing with a sensor head. The sensor head has at least one sensor element for determining a measurand of a measured medium. This sensor element is arranged inside the sensor housing.

Furthermore, the sensor has electronic measuring equipment which is arranged within the sensor housing.

According to the present disclosure, the sensor housing has at least one condensation trap which is arranged at a distance from the electronic measuring equipment and from the sensor element.

The condensation trap is designed in the form of a local region of a wall of the sensor housing with reduced wall thickness relative to the wall regions adjacent to the local region.

Within the scope of the present disclosure, the term process measurement technology sensor also especially includes sensors for gas and liquid analysis to detect physical and/or chemical measurands.

In order to deliberately keep condensation away from sensitive areas, that is to say the sensor elements of the sensor, and from the electronic measuring equipment, a specific condensation point, hereinafter also referred to as a condensation trap, may be attached and/or introduced at a non-critical point in the wall of the sensor housing. This allows a stable measurement over a prolonged period of time.

For the aforementioned problem, the present disclosure offers a solution which is simple to produce and maintenance-friendly.

The temperature and the pressure of the air volume enclosed in the sensor also change as a result of larger temperature fluctuations of the process medium with which the sensor housing is in contact, at least in certain regions, when used as intended. Furthermore, the property of storing water vapor in the air within an air volume in the sensor housing changes via temperature and pressure. In addition, despite precautions such as sealing or the use of desiccant, air always has a certain proportion of moisture which cannot be avoided.

If a hot sensor is cooled rapidly, water vapor condenses at the coldest point. This is usually the inner housing wall of the sensor housing. The thinner the wall thickness, the faster that the inside of the sensor housing may cool there. Condensation will thus always take place at the housing region with the smallest wall thickness. This region is the aforementioned local region of the sensor wall which is to be understood as a condensation trap.

In order to prevent condensation of critical regions, especially of sensor elements or electronic measuring equipment, corresponding wall thickness reduction regions may therefore be introduced into the housing wall as condensation traps, for example be pressed in, whereby condensation in these regions is provoked in a targeted manner.

After the condensation and acclimatization of the air volume, the condensed water may evaporate again. A heating unit can be used in a supporting manner here. Thus, in the event of an absorption sensor, the critical regions—for example the optical path, the light source, the light receiver, and the electronic measuring equipment—remain condensation free, and their functionality is ensured.

Additional advantageous embodiments of the present disclosure are the subject matter of the dependent claims.

The wall is advantageously made of metal in the region of the condensation trap, since metal has good thermal properties for the application.

The wall thickness of the condensation trap may be reduced by at least 20%, preferably by at least 70%, relative to the wall thickness of the adjoining adjacent regions of the wall of the sensor housing, and especially relative to all medium-contacting regions of the wall of the sensor housing.

In the local region which defines the condensation trap, the wall of the sensor housing may have a structured surface, especially a corrugated surface. In a particularly preferred embodiment variant, the corrugated surface may comprise a plurality of grooves which are plane-parallel to one another and preferably run perpendicular to a sensor axis. The structured surface always has a surface structure instead of a smooth surface. In addition to a corrugation, a nubby surface or another form of surface structuring can also ensue. This prevents the condensed droplets from draining out of the condensation trap, for example in the direction of the electronic measuring equipment.

The sensor housing may advantageously have a tubular sensor shaft which is connected to the sensor head, wherein the condensation trap may be designed as a local region running circumferentially along the inner wall of the sensor shaft, especially as a circumferential groove. Surface corrugation may be arranged within the groove.

Alternatively or additionally, the sensor head may have a medium-contacting end face, wherein the condensation trap is arranged in the region of the end face, especially along the inside of a wall region of the sensor housing. The wall region may have both the end face along the outer surface and the condensation trap as an indentation within the wall, along the inner face of the wall corresponding to the end face.

The condensation trap may thereby preferably be designed as an indentation which is arranged along the inner side of the wall of the sensor housing.

To compensate for the reduced stability of the sensor housing in the region of the indentation, this region may be locally hardened, preferably surface-hardened. Adjacent regions outside of the said indentation thus have lower degrees of hardness than the local region of the condensation trap. A typical method of surface hardening is laser or case hardening, for example.

The sensor according to the present disclosure may optionally comprise a humidity sensor. This may optionally be arranged along a surface of the local region of the condensation trap. A corresponding humidity sensor may, for example, be a conductivity sensor or a temperature sensor which may be designed as a resistance temperature sensor and which has droplet detection via evaluation of a measurement curve.

The humidity sensor described above may alternatively also be arranged adjacent to the condensation trap and detect if the condensation trap is filled and can no longer receive moisture.

The sensor may also have a heating unit which is optionally arranged in the local region of the condensation trap or adjacent thereto. This heating unit may be connected in such a way that the condensation trap heats up when the medium is in contact, and thus the liquid therein transitions into the gaseous state during the measurement. After the measurement, the empty condensation trap is then available again for collecting condensed liquid.

A possible preferred safety clearance between the electronic measuring equipment and the sensor element, especially all sensor elements of the sensor apart from the optional moisture sensor, is at least 1 mm, especially at least 15 mm, from the condensation trap.

The sensor may also have a moisture-binding material, wherein this material may be arranged in the region of the condensation trap or adjacent thereto.

A binding material may especially be a porous material or hygroscopic material which may bind the condensate on site, for example in the pores and/or as water of crystallization. In this instance, the aforementioned heating device may additionally ensure regeneration of the material via baking.

BRIEF DESCRIPTION OF THE DRAWINGS

Further advantages, features, and details of the present disclosure will become apparent from the following description, in which an exemplary embodiment of the present disclosure is explained in more detail with reference to the drawings. The person skilled in the art will expediently also individually consider the features disclosed in combination in the drawings, the description, and the claims, and combine them into reasonable further combinations.

In the drawings.

DETAILED DESCRIPTION

Figure 1:
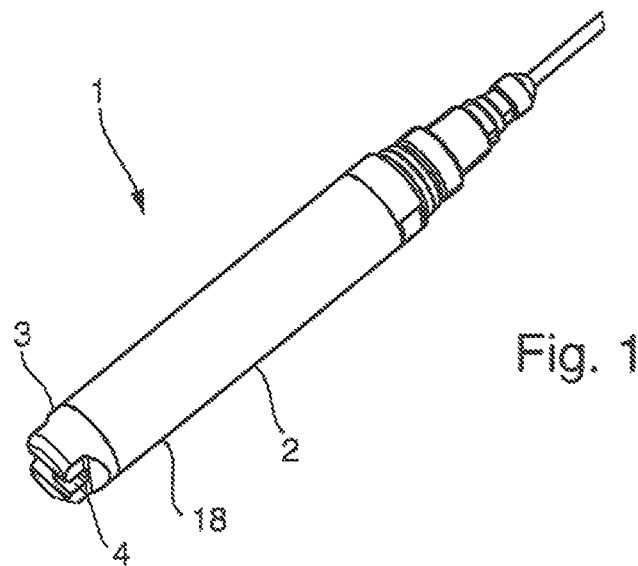
FIG. 1 shows a perspective view of a sensor according to the present disclosure in the embodiment as an absorption sensor for turbidity and solid measurements.
Figure 2:
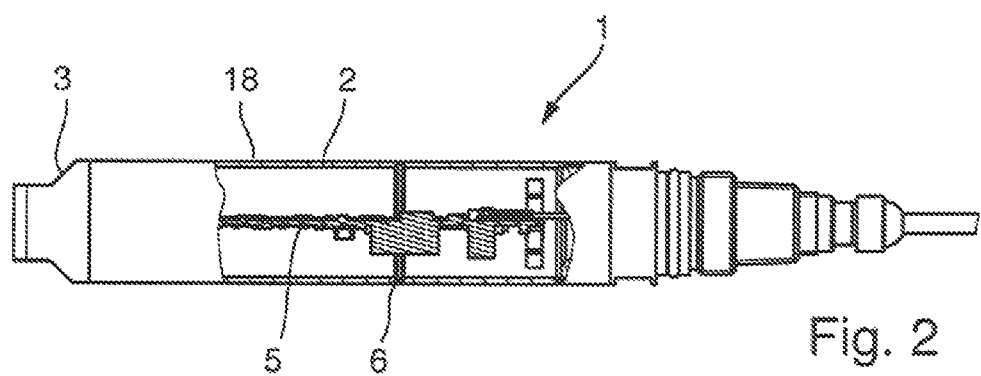
FIG. 2 shows a side view of the sensor of FIG. 1 in partial section.

FIGS. 1 and 2 show a sensor 1 according to the present disclosure in the embodiment as an absorption sensor for turbidity and solid measurements. This sensor operates according to the principle of light attenuation according to ISO7027 in the version prevailing at the time of the application of the present disclosure.

Sensor 1 has a sensor housing 2 comprising a tubular sensor shaft 18 and a sensor head 3 arranged at the end thereof, which sensor head 3, in the present embodiment variant, is arranged on the sensor shaft 18 so as to be detachable. However, variants are also possible in which the sensor head 3 is connected, e.g., welded, to the sensor shaft 18 so as to be undetachable.

The sensor head has a measuring gap 4 which is introduced as an indentation into the end face of the sensor head. The measuring gap is designed in such a way that a medium stream may flow through the measuring gap 4.

Electronic measuring equipment 5 is arranged within the sensor housing 2. Said equipment may have, inter alia, one or more circuit boards and/or electronic components, e.g. for signal processing of a measurement signal.

Since the electronic measuring equipment 5 is susceptible to moisture, the sensor housing has a condensation trap 6. In the embodiment variant of FIG. 2, this is a groove, preferably circumferential, arranged along the inner wall of the sensor housing 2, which groove represents a reduction in wall thickness relative to the adjacent sections of the sensor housing 2, especially of the sensor shaft 18. This groove is unfilled and, compared to the surface of the adjacent segments of the sensor housing 2, may have a greater surface roughness so that condensed liquid remains in the groove.

The groove may advantageously occupy only less than 10%, especially preferably less than 5%, of the surface of the inner wall of the sensor housing 2.

The sensor housing 2 may optionally be surface-hardened in the region of the condensation trap. The loss of stability due to the reduction in wall thickness in the region of the condensation trap may thus be compensated.

Figure 3:
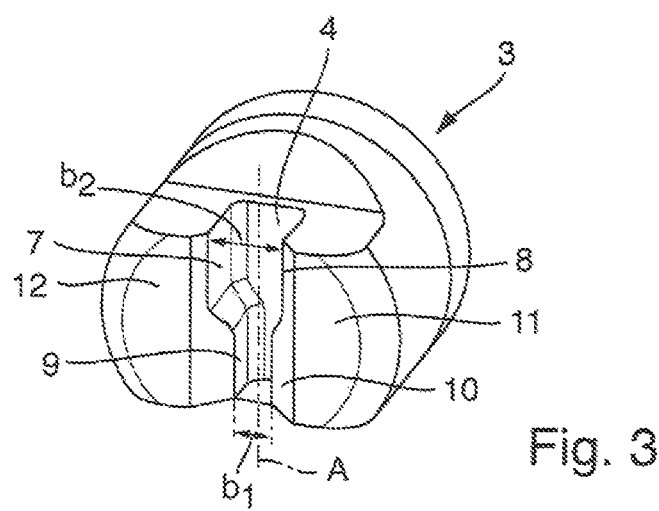
FIG. 3 shows a perspective view of the sensor head of the sensor of FIGS. 1 and 2.
Figure 4:
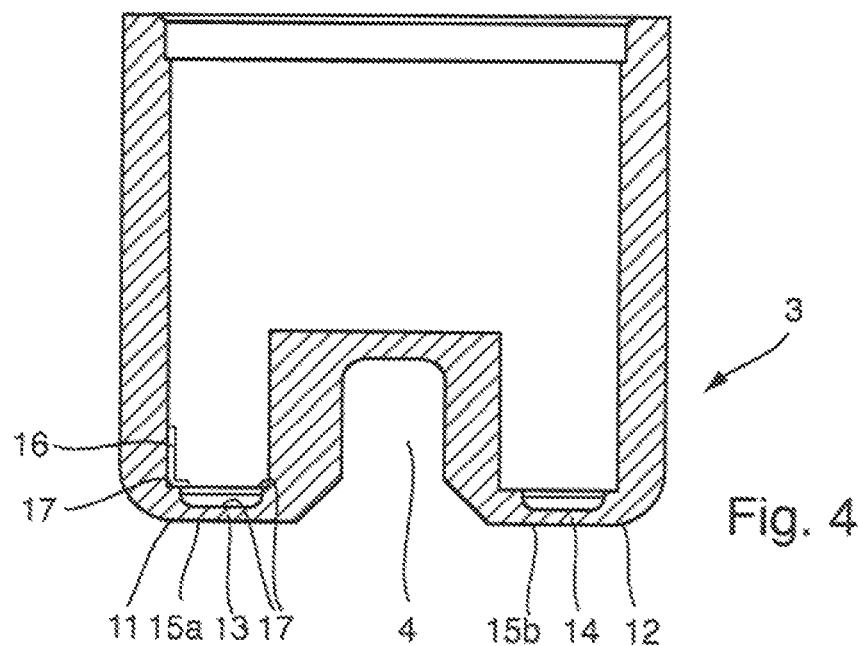
FIG. 4 shows a side sectional view of the sensor head of FIG. 3.
Figure 5:
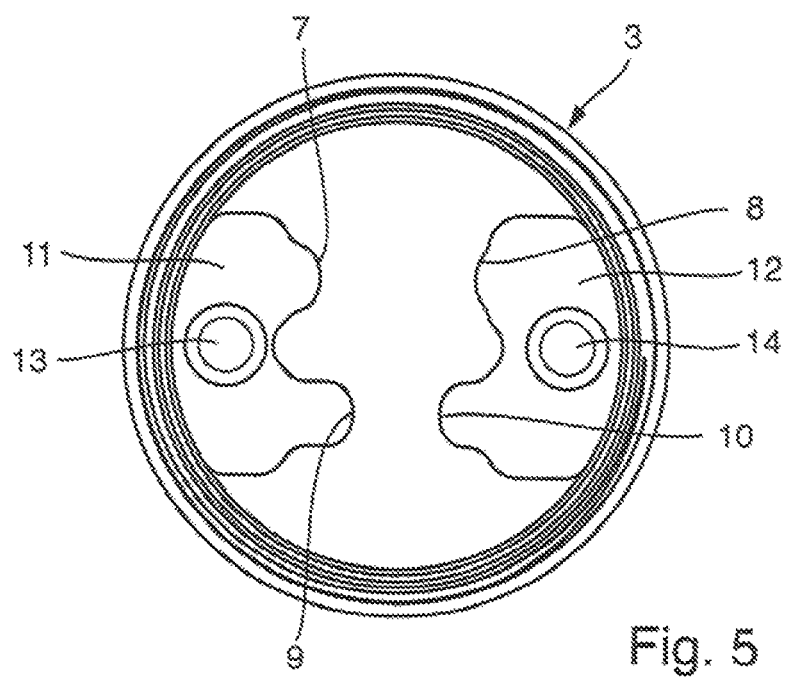
FIG. 5 shows a sectional view from the front of the sensor head of FIG. 3.

The sensor head 3 is shown in more detail in FIG. 3-5. The measuring gap 4 subdivides the sensor head 3 into two terminal projections 11 and 12 between which the measuring gap 4 is arranged. These projections 11 and 12 are especially arranged symmetrically to one another.

The measuring gap 4 has a gap axis A and is subdivided into at least two regions in which the measuring gap 4 has a different gap width b1 and b2. The gap axis A may preferably run perpendicular to a sensor axis defined by the sensor housing 2. In a first of the two regions, a first light source 7 is arranged on a wall 10 of the first projection 11, and a first light receiver 8 is arranged on an opposite wall 10 of the second projection 12. The light source 7 and the light receiver 8 form a first signal path which runs perpendicular to the gap axis A. Accordingly, these two elements are to be understood as sensor elements within the meaning of the present disclosure.

In a second of the two regions, a second light source 9 is arranged on a wall of the first projection 11, and a second light receiver 8 is arranged on an opposite wall of the second projection 12. These form a second signal path which runs perpendicular to the gap axis A.

The length of the first signal path is longer than the length of the second signal path, preferably at least 30% longer, especially is twice as long.

The projections 11 and 12 form an end face which is subdivided by the measuring gap 4 into the end face regions 15a and 15b.

Within the sensor head 3, the wall of the sensor head 3 in the region of the end face regions 15a and 15b has a respective condensation trap 13 and 14 in the form of a wall thickness reduction.

A sensor for humidity detection 16, for example a conductivity sensor, may be arranged in the region of at least one of the condensation traps 13 and/or 14.

As an alternative or in addition to the humidity detection sensor 16, a heating unit may be arranged which heats the condensation traps 13 and 14 for the measuring operation during measurement.

The principle of the arrangement of a condensation trap by reducing the wall thickness may be used not only in an absorption sensor but also in a plurality of further sensors. The exemplary embodiment illustrated in FIG. 1-6 therefore serves to explain the inventive idea, but is in no way to be considered a limitation to this type of sensor.

Arranged along the condensation trap 13 and/or on the edge side thereof is a binding material 17 which prevents any formed condensate from running off. This binding material may analogously also be arranged in the condensation trap 6.

The invention claimed is:

1. A process measurement technology sensor, comprising:
a sensor housing having a sensor head;
a sensor element for determining a measurand of a measured medium, wherein the sensor element is disposed in the sensor head and is arranged inside the sensor housing; and
electronic measuring equipment which is arranged inside the sensor housing,
wherein the sensor housing has, at a distance from the electronic measuring equipment and from the sensor element, a condensation trap in the form of a local region of a wall of the sensor housing having reduced wall thickness.

2. The process measurement technology sensor according to claim 1, wherein the wall thickness of the condensation trap is at least 20% less than a wall thickness of adjacent regions of the sensor housing.

3. The process measurement technology sensor according to claim 1, the wall of the sensor housing has a grooved or corrugated surface in the local region of the condensation trap.

4. The process measurement technology sensor according to claim 1, wherein the sensor housing includes a tubular sensor shaft which is connected to the sensor head, wherein the condensation trap is designed as a local region running circumferentially along an inner wall of the sensor shaft.

5. The process measurement technology sensor according to claim 1, wherein the sensor head has an end face, and wherein the condensation trap is arranged in the region of the end face.

6. The process measurement technology sensor according to claim 1, wherein the condensation trap is designed as an indentation which is arranged along an inner side of the wall of the sensor housing.

7. The process measurement technology sensor according to claim 6, wherein the sensor housing is locally hardened, including surface-hardened, in the region of the indentation.

8. The process measurement technology sensor according to claim 1, further comprising:
a humidity sensor,
wherein the condensation trap includes the humidity sensor, or wherein the humidity sensor is arranged adjacent to the condensation trap.

9. The process measurement technology sensor according to claim 1, further comprising:
a heating unit, wherein the condensation trap has the heating unit, or wherein the heating unit is arranged adjacent to the condensation trap.

10. The process measurement technology sensor according to claim 1, wherein the electronic measuring equipment and the sensor element are arranged at least 8 mm from the condensation trap.

11. The process measurement technology sensor according to claim 1, further comprising:
a moisture-binding material, wherein the condensation trap has this material, or wherein this material is arranged adjacent to the condensation trap.

* * * * *